(12) United States Patent
Schumacher

(10) Patent No.: US 8,659,269 B2
(45) Date of Patent: Feb. 25, 2014

(54) CONTROL UNIT FOR TRIGGERING A PERSONAL PROTECTION ARRANGEMENT

(75) Inventor: Hartmut Schumacher, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 922 days.

(21) Appl. No.: 11/793,194

(22) PCT Filed: Oct. 7, 2005

(86) PCT No.: PCT/EP2005/055083
§ 371 (c)(1),
(2), (4) Date: Mar. 11, 2008

(87) PCT Pub. No.: WO2006/063878
PCT Pub. Date: Jun. 22, 2006

(65) Prior Publication Data
US 2009/0096429 A1    Apr. 16, 2009

(30) Foreign Application Priority Data

Dec. 15, 2004   (DE) .......................... 10 2004 060 296

(51) Int. Cl.
*H02J 7/00* (2006.01)
(52) U.S. Cl.
USPC .......................................... 320/163; 320/104

(58) Field of Classification Search
USPC .......................................... 320/134, 163, 104
See application file for complete search history.

(56) References Cited

U.S. PATENT DOCUMENTS

| | | | | |
|---|---|---|---|---|
| 5,216,284 A | * | 6/1993 | Mattes et al. | 307/10.1 |
| 5,825,098 A | * | 10/1998 | Darby et al. | 307/10.1 |
| 7,420,295 B2 | * | 9/2008 | Omae et al. | 307/66 |
| 2002/0033189 A1 | * | 3/2002 | Macris | 136/203 |

FOREIGN PATENT DOCUMENTS

| | | |
|---|---|---|
| DE | 195 42 085 | 7/1996 |
| DE | 198 07 750 | 3/1999 |
| JP | 2003002156 | 1/2003 |
| JP | 2004262369 | 9/2004 |
| WO | WO2004/012964 A1 * | 2/2004 |

\* cited by examiner

*Primary Examiner* — Edward Tso
*Assistant Examiner* — Aaron Piggush
(74) *Attorney, Agent, or Firm* — Kenyon & Kenyon LLP

(57) ABSTRACT

A control unit for triggering the personal protection arrangement, including a first semiconductor module that is configured to make available various supply voltages and to charge an energy reserve, and including at least one second semiconductor module that is likewise configured to charge the energy reserve, the first and the second semiconductor module each having a semiconductor support.

20 Claims, 2 Drawing Sheets

CONTROL UNIT FOR TRIGGERING A PERSONAL PROTECTION ARRANGEMENT

FIELD OF THE INVENTION

The present invention relates to a control unit for triggering a personal protection arrangement or structure.

SUMMARY OF THE INVENTION

The control unit according to the exemplary embodiment and/or exemplary method of the present invention for triggering the personal protection arrangement, having the features described herein, has the advantage that because a further semiconductor module is made available in addition to a first semiconductor module into which various basic functions of the control unit are already integrated, so that the control unit can function alone in the context of a given range of functions, the heat load on the first semiconductor is reduced. The two semiconductor modules—both the first and the second—are each implemented on a semiconductor support, i.e. on a respective silicon substrate. The number of functions that can be implemented on a semiconductor module of this kind is limited, for example, by the permissible thermal limit of the semiconductor support. If more functions nevertheless need to be integrated, a second semiconductor support, for example, is then desirable. This second semiconductor support is advantageously embodied inexpensively and with little outlay. In order to reduce the thermal load on the first semiconductor module, it is proposed here to cause charging of the energy reserve to be carried out not only by the first semiconductor module, but also to provide the second semiconductor module. The reduction in the losses that occur in the charging circuit of the first semiconductor module, specifically because of the finite internal resistance of the semiconductor module in up-conversion mode, are markedly reduced by parallel connection with the internal resistance of the second semiconductor module. The total resistance of a parallel circuit is lower than the resistance of a single module. A reduction in the support temperature thus also occurs, and therefore an increase in the power supply capabilities that the first semiconductor module can provide. This is necessary especially in order to supply power to the circuit blocks in the second semiconductor module, and to allow an increase in the performance of the microcontroller in the control unit. The performance increase is expressed as higher speed and increased memory.

The features and refinements described herein make possible advantageous improvements in the control unit described herein.

It is particularly advantageous that the first and the second semiconductor module are configured to charge the energy reserve to the voltage level of the vehicle battery. A first stage in the charging of the energy reserve is then achieved thereby, which reserve is usually charged in the range from 20 to 50 volts, i.e. to a superelevated voltage as compared with the vehicle battery voltage.

It is additionally advantageous that a voltage down-converter is provided in the first semiconductor module to make available a first supply voltage, sensors connected to the control unit—such as acceleration, temperature, and pressure sensors—being supplied with this first supply voltage. The second semiconductor module, however, derives this first supply voltage from the voltage level of the vehicle battery, and thus likewise powers sensors connectable to the control unit.

Advantageously, the second semiconductor module has a circuit for detecting failure of the vehicle battery. With this, the second semiconductor module signals to the first semiconductor module to interrupt charging of the energy reserve and to power the sensor or sensors that were hitherto being supplied with battery voltage via the second semiconductor module, as well as the other sensors, by withdrawing energy from the energy reserve by using the down-converter in the first semiconductor module.

For charging of the energy reserve, the first semiconductor module is configured in such a way that it charges the energy reserve to a superelevated voltage as compared with the vehicle battery voltage. Upon failure, in particular in a context of insufficient voltage (UBAT<6 V) of the vehicle battery or the vehicle's electrical system (autonomy, undersupply), the up-converter present in the first semiconductor module is inhibited. In addition, the prechargers in all modules are inhibited, i.e. no further current is taken from battery voltage in order to charge the energy reserve. The power dissipation occurring in the first semiconductor module because of the process of charging the energy reserve in an underpower situation is thereby eliminated. The dissipated power that is saved in the event of underpower and autonomy is made available to the down-converter to generate a first supply voltage, so that the sensors can additionally be powered by the first semiconductor module, likewise from the first supply voltage, without exceeding the maximum total power dissipation of the first semiconductor component.

The first and the second semiconductor module each have a circuit for linkage of the external sensors, circuits for sensing switch positions, Hall sensor signals, for firing and checking firing circuits and for communication with data lines. The data lines are understood to include, for example, a bus system such as LIN, CAN, and the so-called serial peripheral interface (SPI) bus.

DETAILED DESCRIPTION

Control units for triggering the personal protection arrangement such as airbags, belt tensioners, or rollover bars, or also pedestrian protection systems, have a variety of integrated circuits; such integrated circuits can also be manufactured on a semiconductor support, i.e. a semiconductor substrate. Semiconductor modules of this kind are used for a variety of functions. Interface functions, triggerings of the firing circuits, and the voltage supply of the control unit, for example, are integrated into such semiconductor modules. The heat evolution on a semiconductor substrate is an important parameter in this context, limiting the number of functions that can be integrated onto a semiconductor substrate.

It is proposed to provide at least one second semiconductor module, in addition to a first semiconductor module, in order to limit heat evolution on the first semiconductor module. It is proposed here that the second semiconductor module also participate in charging of the energy reserve. In addition, the second semiconductor substrate is also intended to supply current to some of the sensors externally connected to the control unit. To keep the second semiconductor module as simple as possible, this second semiconductor module derives the supply voltage for the sensors from the voltage of the vehicle battery. A simple voltage-limiting circuit is used, for example, for this. The first semiconductor module has, on a semiconductor support, a powering unit, output stages for firing circuits, interfaces to external sensors, analog inputs and outputs, e.g. switch queries, and lamp drivers, as well as receiver and transmitter modules for data communication, e.g. via LIN, CAN, or SPI. As set forth above, the limiting factor is the thermal limit of the semiconductor support. If further functions are intended to be made available in a semiconductor module of this kind for an airbag control unit, a second semiconductor module that takes over these further functions is proposed. In a so-called autonomy situation, i.e. a situation in which the vehicle battery voltage is depleted, the energy necessary for the control unit is taken from the energy reserve. As a result of the energy from the energy reserve, the control unit is intended to remain fully functional for a predetermined time. The second semiconductor module can be constructed without its own switching and linear controller.

Figure 1:
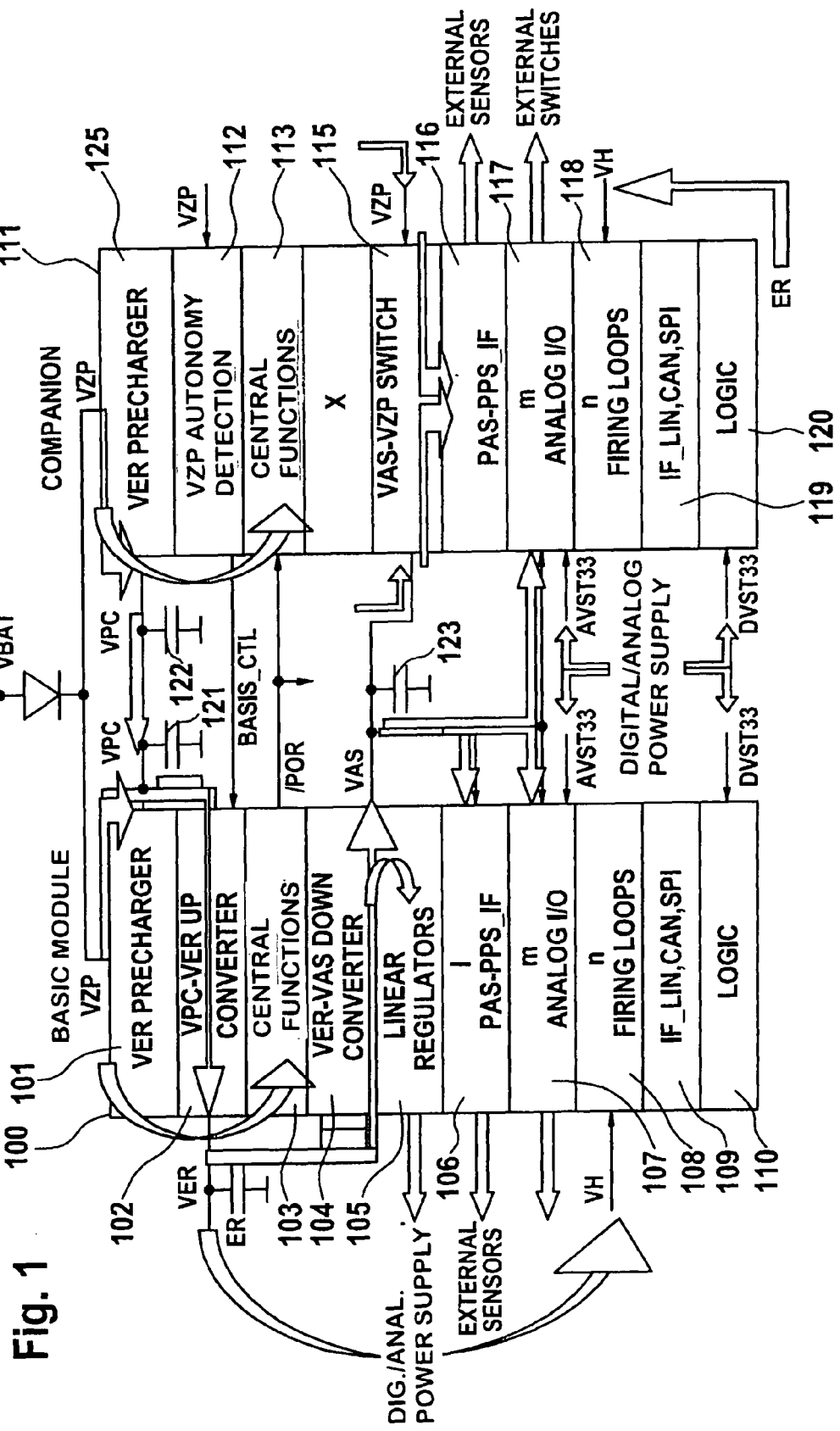
FIG. 1 shows a block diagram of the first and second semiconductor modules in the control unit.

FIG. 1 is a block diagram showing first and second semiconductor modules 100, 111 in a control unit for triggering the personal protection arrangement. By way of voltage $v_{bat}$, the vehicle battery voltage is received by the two modules 100 and 111, via conductors 1b and 1c, as voltage $v_{zp}$. Modules 101 in the first semiconductor module and 111 in the second semiconductor module serve for an initial charging of energy reserve $e_R$, which is connected directly to module 102. At a later stage, energy reserve $e_R$ will then be further charged from block 102, by way of a voltage up-converter, to the superelevated voltage value of, for example, 20 to 40 volts. Blocks 103 and 113 (central functions) contain circuit elements that are required for multiple IC function blocks, e.g. voltage reference (band gap), current reference, clock generator, power-on reset generator, voltage monitoring, temperature monitoring. Block 104 is used as a down-converter for the battery voltage so that in an underpower (UBAT<6 V) or autonomy situation, the external sensors can be supplied with voltage $v_{as}$ via module 115 of the second semiconductor module.

Figure 2:
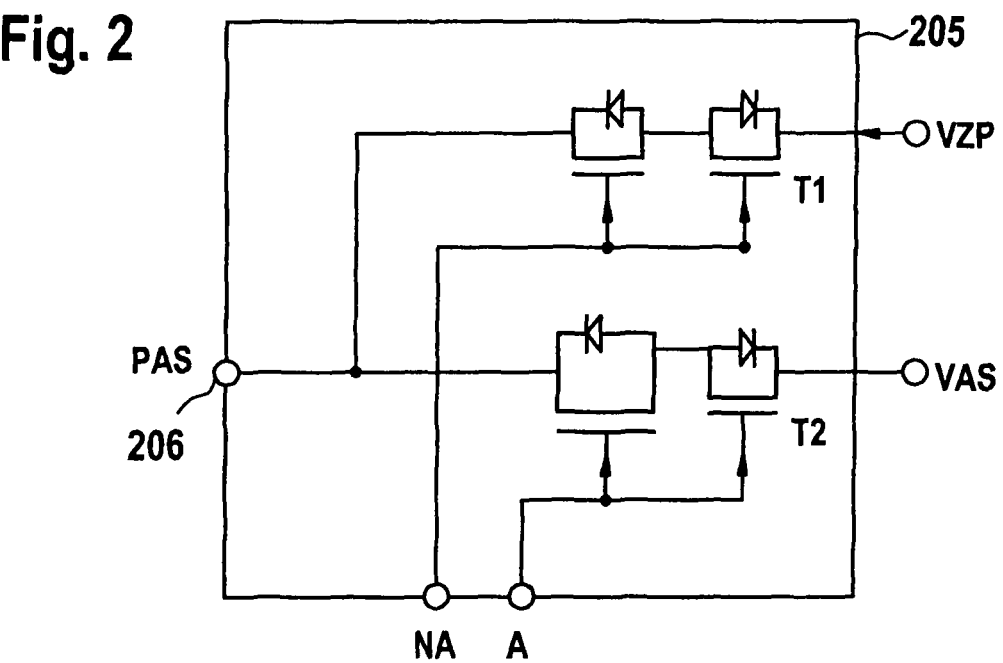
FIG. 2 shows a block diagram of a functional block.

Functional module 115 supplies interfaces 116 with energy. Normally this is taken from VZP and thus directly from the battery. In a situation of autonomy or underpower (UBAT<6 V), function 115 enables a switchover of the power to VAS. This can be accomplished by way of a transistor switch. FIG. 2 shows function block 200 in terms of its configuration. Normally, NA is at a high level and powers the interface via the conductive transistors T1, T11 from VZP. A is at zero level, and T21 and T2 are blocked. In an autonomy situation, A is at a high signal level and powers interface 206 via the conductive transistors T21, T2 from VAS. As a result of the so-called back-to-back disposition of N-MOSFETs T1, T11 and T2, T21, VAS is polarity-protected with respect to VZP with no need to use a diode. Other types of transistors are alternatively usable.

The linear voltage regulators in module 100 in functional block 105 generate, from the first supply voltage (VAS), the stabilized digital and analog voltages required for an airbag system. VST50=5 V and VST33=3.3 V are generated here by way of example.

Blocks 106 in the first semiconductor module and 116 in the second semiconductor module serve for voltage supply to and data communication with the externally connected sensors. Blocks 107 in the first semiconductor module and 117 in the second semiconductor module serve to control lamps and provide measurement, power, and evaluation for analog sensors, e.g. switches or Hall sensors. Blocks 108 in first module 100 and 118 in second module 111 serve as firing circuit output stages for the triggering and evaluation thereof. Block 109 in first semiconductor module 100 and 119 in second semiconductor module 111 serve as communication modules (interfaces) for communication via data lines such as LIN, CAN, or SPI. Provided in each of blocks 110 and 120 of the first and second semiconductor modules, respectively, is a respective digital logic unit that serves to control overall module functionality.

FIG. 1 thus shows the first and the second semiconductor module for construction of an airbag control unit electronic system. The first semiconductor module alone contains, except for the microcontroller and connected sensor suite, all the basic functions that are necessary for an airbag control unit. The power unit and thermal properties of the first semiconductor module are designed so that all digital and analog functions of this module of the basic microcontroller, of the sensor equipment inside control units of connected sensors with current interface, analog sensors, connected standard firing circuits and connected communication interfaces can be powered; specifically in a defined voltage range of the motor vehicle and a defined temperature range of the first semiconductor module. The defined voltage range of the voltage supply can extend, for example, from 6 to 20 volts. The defined temperature range of the first, packaged semiconductor module can be, for example, between −40 and +105° C. In addition to a second semiconductor module, further semiconductor modules can be provided so that further tasks can be handled and in order to reduce the power dissipation in the energy reserve charging circuit (functional block 101, 102) so that the energy required to power the further tasks in the modules can additionally be made available by module 100, and the latter does not become thermally overloaded. The prechargers (charging circuits) present in the two semiconductor modules ensure that precharging of the energy reserve to approximately battery-voltage level is now possible in tandem, using two or n current controllers. As a result, for the same embodiment of the charging circuit in the semiconductor modules, the speed of charging the energy reserve to battery level can be increased n times for the same capacity, or can be kept constant for n times the capacity (as is necessary for systems n times as large).

Arrows 1b and 2b indicate the energy path from battery $v_{bat}$, $v_{zp}$, via block 101, a coil, and circuit blocks of a clock-timed up-converter, to energy reserve $e_r$ in first semiconductor module 100. Arrows 1c and 2c show the path of the additional energy from battery $v_{bat}/v_{zp}$ via block 125 to the coil to $v_{pc}$. If the charging current of precharger 101 in module 100 is $i_{pb}$, and the charging current of precharger 125 in the companion module is $i_{pc}$, the total charging current of the energy reserve or up-converter is then $i_p=i_{pb}+i_{pc}$. In clock-timed operation, up-converter 102 in first semiconductor module 100 possesses a defined up-conversion efficiency. Under defined conditions for external energization, load current $i_{er}$, input and output voltage, clock frequency, and temperature, this is a fixed value. The addition of second semiconductor module 111 greatly reduces the losses that occur in charging circuit 101 of first semiconductor module 100, because of the finite internal resistance $r_{ib}$ of this device in up-conversion mode due to the parallel resistance $r_{ic}$ of the charging circuit in second semiconductor module 111. The reason is that the total resistance of the parallel charging circuits drops, corresponding to $r_i=r_{ib}*r_{ic}/(r_{ib}+r_{ic})$.

The increase in the efficiency of the up-converter of first semiconductor module 100, improved by second semiconductor module 111, results in a reduction in the substrate temperature of first semiconductor module 100 for a given load on the supply unit, or an increase in power supply capabilities for a given temperature.

These increased power supply capabilities are desirable so that the now-larger system can be powered. This involves, in particular, the supply current required for analog and digital circuit blocks in second semiconductor module 111, and for increasing the microcontroller's performance in terms of speed and memory in larger systems.

One essential circuit block of first semiconductor module 100 is up-converter 102. This is powered by VZP (UBAT) from a precharger on chip 101 or further prechargers in modules 111 etc., and supplies the single VER-VAS down-converter, connected as the load, with energy from UBAT, which is converted to a higher voltage level (20-40 V) than VER. The energy flows from the down-converted so-called analog supply voltage VAS are indicated by arrows such as 5b, 6b, 7b, 7c. If the number of external sensors needs to be increased in a larger system, the thermal load in first semiconductor module 100 then rises, in particular because of greater losses in converter 102. In order to find a solution here that does not necessitate a further circuit converter in the second semiconductor module, the invention provides for a new approach in which power to the additional external sensors is provided directly from the vehicle's battery via an interface in the second semiconductor module, and energy is drawn from the first semiconductor module $v_{as}$ only in an autonomy situation, i.e. when the battery voltage is absent or too low.

In FIG. 1, autonomy detector 112 recognizes that $v_{zp}$ is too low to maintain the specified normal operation, for example $v_{zp}$ is less than 5.2 V. In this case the second semiconductor module signals the autonomy situation to the first semiconductor module with the aid of the Basis_CTL signal. Charging circuit 101 and up-converter 102 of first semiconductor module 100, and charging circuit 125 of second semiconductor module 111, are inhibited. The power dissipation of the entire energy reserve charging device in the first semiconductor module is thus eliminated. This is not insignificant, since for low input voltages ($v_{zb}$=5.2 volts), the efficiency of the energy reserve charging device assumes the lowest value for a long charging phase as compared with the inhibited phase. For example: an energy reserve charging device having a useful power level of $v_{er}$=35 V and $i_{er}$=75 mA and an efficiency of e.g. 0.65 results in a power dissipation of 1.4 W. Assuming a thermal resistance of 32 K/W for the first semiconductor module, the temperature load on the first semiconductor module can thus be reduced by 44.8 K.

The power proceeding from $v_{zp}$ under normal conditions for the external sensors of the second semiconductor module, labeled 5c in the Figure, is switched over after the autonomy detection 112 to the voltage $v_{as}$ of the first semiconductor module, labeled 6c.

This causes an increase in the load on the $v_{as}$ supply from first semiconductor module 100, which already ensures that power 5b, 6b, 7b, and 7c is supplied. This is thermally possible only because the thermal load on first semiconductor module 100 has been relieved by elimination of the losses of the energy reserve charging device, and higher losses in the down-converter are thus possible without exceeding the maximum temperature of the substrate material.

In a further embodiment, FIG. 1 can be expanded with further semiconductor modules in accordance with the second semiconductor module. Each such module, having interfaces to the external sensors, must be switchable, by way of an autonomy detection circuit that may or may not be a constituent of the module, powering the interfaces with $v_{zp}/v_{bat}$ to a regulated voltage $v_{as}$ made available by the first semiconductor module.

A few examples are given below. In a first example, battery voltage $v_{zp}$ is greater than 5.2 volts and greater than the present voltage $v_{er}$. The system is, for example, in the startup phase (VER=0, VZP=12 V). The energy reserve is being charged in parallel by prechargers 101 in semiconductor module 100 and 125 in semiconductor module 111. The external sensors that are connected to interfaces 105, 107 of first semiconductor module 100 and to interfaces 116, 117 of the second semiconductor module are not being powered; the interfaces are inhibited so that the energy reserve can be rapidly brought approximately to battery voltage. The second semiconductor module therefore sends the signal BASIS_CTL=1 to first semiconductor module 100.

In the second operating mode, VZP≈VER, i.e. the energy reserve is precharged and VZP>5.2 V (UBAT>6 V); semiconductor module 111 sends the BASIS_CTL=1 signal to the first semiconductor module and thereby once again signals that the autonomy monitoring system in module 111 sees sufficient battery voltage. The two prechargers both in module 100 and in module 111 therefore remain active. In this operating range, however, module 100 additionally recognizes that the energy reserve voltage is at battery-voltage level, and therefore activates the up-converter. In addition, the operation of precharger 101 is limited only to a higher current level. The same information is also transmitted to the precharger in module 111 by the signal CMP_CTL=0.

The energy reserve is now charged, by a converter whose efficiency is improved by the parallel connection of the internal resistances of the saturated transistors in prechargers 101, 125, to a voltage between 20 V and 40 V, typically to 35 V.

The control unit is in the normal state. External sensors PAS, PPS of the control unit, which are connected to the first semiconductor module, are powered from VAS. Those that are connected to the second semiconductor module are powered from VZP.

In the third operating range, an autonomy situation or underpower situation has occurred, characterized by VZP<5.2 V. Second semiconductor module 111 reports the autonomy situation to the first module via BASIS_CTL=0. This signal causes inhibition of precharger 101 and up-converter 102 in module 100. In the second module, the autonomy situation likewise causes inhibition of precharger 125. The CMP_CTL signal has no significance here.

Functional group 115 is switched on by detection of the autonomy situation, i.e. external sensors PAS, PPS connected to the second semiconductor module are now, like those connected to the first semiconductor module, powered from VAS.

As discussed above, any number of further semiconductor modules can be provided in order to relieve the load accordingly on the first and second semiconductor modules.

What is claimed is:

1. A control unit for triggering a personal protection arrangement, comprising:
   a first semiconductor module that is configured to generate supply voltages and charge an energy reserve from an external voltage source; and
   at least one second semiconductor module having an internal resistance coupled in parallel to an internal resistance of the first semiconductor module, the at least one second semiconductor module configured to charge the energy reserve from the external voltage source;
   wherein the first semiconductor module and the at least one second semiconductor module each include a heat dissipating medium, wherein the control unit triggers the personal protection arrangement.

2. The control unit of claim 1, wherein the first semiconductor module and the at least one second semiconductor module are configured to charge the energy reserve to a voltage level of a vehicle battery.

3. The control unit of claim 1, wherein the first semiconductor module includes a voltage down-converter to supply a first supply voltage to at least one first sensor coupled to the control unit, and wherein the at least one second semiconductor module derives the first supply voltage from a voltage level of a vehicle battery and supplies the derived first supply voltage to at least one second sensor coupled to the control unit.

4. The control unit of claim 1, wherein the at least one second semiconductor module includes a circuit for detecting a failure of a vehicle battery.

5. The control unit of claim 4, wherein, the first semiconductor module is coupled to the at least one second semiconductor module to interrupt charging and instead supply a sensor with a first supply voltage responsive to the detected failure of the vehicle battery.

6. The control unit of claim 5, wherein the first semiconductor module is configured to charge the energy reserve to a superelevated voltage, and, responsive to the detected failure of the vehicle battery, the first semiconductor module prevents a voltage up-converter from generating the superelevated voltage.

7. The control unit of claim 1, wherein the first semiconductor module and the at least one second semiconductor module each include a respective circuit for linking sensors, controlling switches, controlling firing circuits, and communicating with data lines.

8. The control unit of claim 1, wherein the heat dissipating medium of the first semiconductor module dissipates a maximum heat load on the first semiconductor module.

9. The control unit of claim 1, wherein the heat dissipating medium is a silicon substrate.

10. The control unit of claim 1, wherein the first semiconductor module and the at least one second semiconductor module are configured to charge the energy reserve to a voltage level of a vehicle battery, wherein the first semiconductor module includes a voltage down-converter to supply a first supply voltage to at least one first sensor coupled to the control unit, and wherein the at least one second semiconductor module derives the first supply voltage from the voltage level of the vehicle battery and supplies the derived first supply voltage to at least one second sensor coupled to the control unit.

11. The control unit of claim 10, wherein the first semiconductor module and the at least one second semiconductor module each include a respective circuit for linking sensors, controlling switches, controlling firing circuits, and communicating with data lines, and wherein the heat dissipating medium of the first semiconductor module dissipates a maximum heat load on the first semiconductor module, and wherein the heat dissipating medium is a silicon substrate.

12. The control unit of claim 1, wherein the at least one second semiconductor module includes a circuit for detecting a failure of a vehicle battery, wherein the first semiconductor module is coupled to the at least one second semiconductor module to interrupt charging and instead supply a sensor with a first supply voltage responsive to the detected failure of the vehicle battery, wherein the first semiconductor module is configured to charge the energy reserve to a superelevated voltage, and, responsive to the detected failure of the vehicle battery, the first semiconductor module prevents a voltage up-converter from generating the superelevated voltage, and wherein the heat dissipating medium is a silicon substrate.

13. The control unit of claim 12, wherein the first semiconductor module and the at least one second semiconductor module each include a respective circuit for linking sensors, controlling switches, controlling firing circuits, and communicating with data lines, and wherein the heat dissipating medium of the first semiconductor module dissipates a maximum heat load on the first semiconductor module.

14. The control unit of claim 1, wherein the personal protection arrangement is an airbag.

15. A control unit for triggering a personal protection arrangement, comprising:
 a first semiconductor module that is configured to generate supply voltages and charge an energy reserve from an external voltage source through a charging circuit of the first semiconductor module; and
 at least one second semiconductor module having an internal resistance of a saturated transistor in a charging circuit of the second semiconductor module coupled in parallel to an internal resistance of a corresponding saturated transistor in the charging circuit of the first semiconductor module, the charging circuit of the second semiconductor module configured to also charge the energy reserve and each of the semiconductor modules configured to generate distinct supply voltages from the external voltage source;
 wherein the first semiconductor module and the at least one second semiconductor module each include a heat dissipating medium.

16. The control unit of claim 15, wherein the second semiconductor module includes an interface to provide power to an external sensor directly from the external voltage source when a voltage of the external voltage source exceeds a threshold and otherwise provide power to the external sensor from the first semiconductor module.

17. The control unit of claim 15, wherein responsive to the external voltage source exceeding a threshold while the energy reserve is not precharged, the charging circuits in the first and the second semiconductor modules are coupled to the external voltage source to charge the energy reserve in parallel while external sensors connected to the first and the second semiconductor modules are unpowered, wherein responsive to the external voltage source exceeding the threshold while the energy reserve is precharged, the charging circuits in the first and the second semiconductor modules are coupled to the external sensors, each of the charging circuits powering at least one of the external sensors, and wherein responsive to the external voltage source not exceeding the threshold, the charging circuits in the first and the second semiconductor modules are inhibited and the first semiconductor module exclusively powers each of the external sensors.

18. The control unit of claim 15, wherein the first semiconductor module and the at least one second semiconductor module are configured to charge the energy reserve to a voltage level of a vehicle battery, wherein the first semiconductor module includes a voltage down-converter to supply a first supply voltage to at least one first sensor coupled to the control unit, and wherein the at least one second semiconductor module derives the first supply voltage from the voltage level of the vehicle battery and supplies the derived first supply voltage to at least one second sensor coupled to the control unit.

19. The control unit of claim 15, wherein the at least one second semiconductor module includes a circuit for detecting a failure of a vehicle battery, wherein the first semiconductor module is coupled to the at least one second semiconductor module to interrupt charging and instead supply a sensor with a first supply voltage responsive to the detected failure of the vehicle battery, wherein the first semiconductor module is configured to charge the energy reserve to a superelevated voltage, and, responsive to the detected failure of the vehicle battery, the first semiconductor module prevents a voltage up-converter from generating the superelevated voltage, and wherein the heat dissipating medium is a silicon substrate.

20. The control unit of claim 15, wherein the personal protection arrangement is an airbag.

* * * * *

UNITED STATES PATENT AND TRADEMARK OFFICE
CERTIFICATE OF CORRECTION

PATENT NO.        : 8,659,269 B2
APPLICATION NO.   : 11/793194
DATED             : February 25, 2014
INVENTOR(S)       : Hartmut Schumacher It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1315 days.

Signed and Sealed this

Twenty-ninth Day of September, 2015

Michelle K. Lee
*Director of the United States Patent and Trademark Office*